(12) United States Patent
Chen et al.

(10) Patent No.: US 7,706,041 B2
(45) Date of Patent: Apr. 27, 2010

(54) SCANNING MODULE OF IMAGE SCANNER

(75) Inventors: Hsi-Yu Chen, Taipei (TW); Kuan-Yang Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 620 days.

(21) Appl. No.: 11/422,283

(22) Filed: Jun. 5, 2006

(65) Prior Publication Data
US 2007/0195440 A1 Aug. 23, 2007

(30) Foreign Application Priority Data
Feb. 17, 2006 (TW) ............................... 95105348 A

(51) Int. Cl.
*G02B 26/10* (2006.01)
*F16H 37/00* (2006.01)

(52) U.S. Cl. ................. 359/221.1; 359/226.1; 359/871; 476/27

(58) Field of Classification Search ......... 359/212–215, 359/221.1, 226.1; 476/27, 34
See application file for complete search history.

(56) References Cited

U.S. PATENT DOCUMENTS

| 4,623,239 | A | * | 11/1986 | Zambelli | 399/212 |
| 4,728,988 | A | * | 3/1988 | Tsutsui et al. | 399/212 |
| 6,115,146 | A | * | 9/2000 | Suzuki et al. | 358/474 |
| 2005/0105076 | A1 | * | 5/2005 | Jung et al. | 356/4.01 |
| 2005/0220517 | A1 | * | 10/2005 | Matsushima et al. | 399/388 |
| 2006/0071400 | A1 | * | 4/2006 | Johnson et al. | 271/121 |
| 2006/0180987 | A1 | * | 8/2006 | Hattori | 271/117 |

* cited by examiner

*Primary Examiner*—Stephone B Allen
*Assistant Examiner*—Jade R Callaway
(74) *Attorney, Agent, or Firm*—Apex Juris, pllc; Tracy M Heims

(57) ABSTRACT

A scanning module of an image scanner for scanning a document includes a base, a reflective mirror stand mounted on the base, a shaft rotatably mounted on the reflective mirror stand, a reflective mirror member fixed on the shaft and rotatable with the shaft, and a gear set pivotally coupled to the shaft for rotating and driving the shaft to adjust the reflective angle of the reflective mirror member.

6 Claims, 6 Drawing Sheets

SCANNING MODULE OF IMAGE SCANNER

FIELD OF THE INVENTION

The present invention relates to a scanning module of an image scanner, and more particularly to a scanning module having a reflective mirror adjustable mechanism for adjusting the angle of the reflective mirror contained in the scanning module.

BACKGROUND OF THE INVENTION

With increasing development of image processing technologies, image scanners become essential peripheral devices of the computer system and are used for scanning documents. The images of the scanned documents can be converted into digital files, which can be stored in, transmitted to or further processed by the computer, or otherwise directly printed.

Generally, flatbed image scanners are the widely used image scanners. The flatbed image scanners are advantageous because most documents can be scanned by such flatbed image scanners regardless of a single sheet or a thick book. However, the volume of the flatbed image scanner may occupy much working space, which is adverse to space utilization. In addition to increased image quality of the scanned document, the image scanners are designed and developed toward small size and light weightiness.

Since most documents to be scanned have specified sizes or conform to specified specifications, a certain planar area for the image scanner is inevitable. In order words, for a purpose of shrinking volume or decreasing weight of the image scanner, it is necessary to reduce the thickness of the image scanner. As a consequence, a so-called slim type image scanner is developed. On the other hand, an image scanner principally comprises a scanning module, which has a photosensing function and movable along the scanning direction to scan the document. Since this scanning module occupies much space of the image scanner, it is required to shrink the volume of the scanning module when the slim type image scanner is designed.

Referring to FIG. 1, a schematic cross-sectional view of a conventional scanning module 100 is illustrated. As shown in FIG. 1, in the rectangular housing 11 of the conventional scanning module 100, a light source 12, a reflective mirror set 13, an optical lens 14 and an image sensor 15 are provided. An exemplary optical sensor 15 of the scanning module 100 includes a charge couple device (CCD), a CMOS sensing element and the like. The process for performing a scanning operation will be illustrated as follows. Firstly, the light emitted by the light source 12 is projected onto a document 102, which is placed on a transparent platform 101. The light reflected from the scanned document 102 is reflected by the reflective mirror set 13, and then focused by the optical lens 14. The focused light is then imaged onto the image sensor 15 to convert the optical signals into analog electrical signals. In this conventional technology, the reflective mirror set 13 is fixed within the scanning module 100. The reflective mirror set 13 includes plural reflective mirrors, which are hooked on the rectangular housing 11 by means of corresponding plastic hooking elements integrally formed on the rectangular housing 11. Due to mechanical precision tolerance during the process of fabricating these hooking elements, these reflective mirrors may have inherent angle deviation. As known, the inherent angle deviation may adverse affect the optical path resulted from the plural reflective mirrors.

If the volume of the scanning module is huge enough, the influence of the angle deviation is relatively small and the optical path is not considerably affected. Whereas, in a case that a slim type image scanner or a slim type scanning module is designed, any tiny reflective angle deviation may seriously or adversely affect the optical path associated with the scanned image of the document. Therefore, when the slim type scanning module is designed, the angle deviation needs to be taken into consideration and thus a suitable reflective mirror adjustable mechanism is provided to minimize the influence of the angle deviation.

In a co-pending Taiwanese Patent Application No. 94133457, entitled "Scanning module of image scanner", which was filed by the same assignee of the present application and the contents of which are hereby incorporated by reference, a method and a device for solving the above problems are disclosed. Please refer to FIGS. 2(a) and 2(b), which are schematic perspective and side views of the scanning module 200 of this co-pending application, respectively. For clarity and neat drawing, however, only one reflective mirror is shown in the drawing. As shown in FIG. 2(a), a screw hole 22 and a screw 23 are provided at a side wall 211 of the rectangular housing 21 of the scanning module 200. The screw 23 is penetrated through the screw hole 22. The locations of a hooking element 24 and a reflective mirror 25 inside the rectangular housing 21 corresponds to those of the screw hole 22 and the screw 23. If the actual reflective optical path B is deviated from the ideal reflective optical path A, the assembler may rotate the screw 23 to adjust the reflective angle of the reflective mirror 25 due to the tiny shift of the screw 23. The deviation between the actual reflective optical path B and the ideal reflective optical path A is also illustrated in FIG. 2(b).

Although this reflective mirror adjustable mechanism may adjust the reflective angle and the reflective optical path of the reflective mirror 25, there are still some drawbacks. For example, since the length of the screw 23 needs to be shrunk when the slim type scanning module is designed, fine tuning or precisely tuning is impossible. In other words, coarse tuning of the reflective mirror adjustable mechanism is permissible because the rotational degree of the screw 23 is limited. In addition, according to cooperation of the screw 23 and the hooking element 24, the reflective mirror adjustable mechanism is adjustable along a single direction rather than the reverse direction.

In views of the above-described disadvantages of the prior art, the applicant keeps on carving unflaggingly to develop an improved scanning module of an image scanner according to the present invention through wholehearted experience and research.

SUMMARY OF THE INVENTION

It is an object of the present invention to provide a scanning module of an image scanner having a reflective mirror adjustable mechanism for adjusting reflective angle of the reflective mirror contained therein.

Another object of the present invention is to provide a scanning module of an image scanner having a reflective mirror adjustable mechanism, which is allowable to perform fine tuning of angle adjustment and easily operable.

In accordance with an aspect of the present invention, there is provided a scanning module of an image scanner for scanning a document. The scanning module of the image scanner comprises a base, a reflective mirror stand, a shaft, a reflective mirror member and a gear set. The reflective mirror stand is mounted on the base. The shaft is rotatably mounted on the reflective mirror stand. The reflective mirror member is fixed on the shaft and rotated with the shaft. The gear set is pivotally coupled to the shaft for rotating and driving the shaft to adjust the reflective angle of the reflective mirror member, which is fixed on the shaft.

In an embodiment, the gear set comprises a gear stand, a drive gear and a driven gear. The gear stand is disposed on the base. The drive gear is sheathed around a drive gear shaft and rotatably mounted on the gear stand, so that the drive gear is rotated with the drive gear shaft. The driven gear is rotatably mounted on one side of the reflective mirror stand and sheathed around the shaft to be rotated with the shaft, wherein the driven gear is engaged with the drive gear.

In an embodiment, the drive gear shaft has a hole exposed to the outside of the gear set, so that the drive gear is rotated by a rotating tool after the rotating tool is inserted into the screw hole.

In an embodiment, the number of teeth on the driven gear is more than the number of teeth on the drive gear, so that the driven gear is driven to rotate at a relatively smaller angle when the drive gear is rotated at a relatively larger angle.

In an embodiment, the driven gear is driven to rotate when the drive gear is rotated, and the rotational angle of the driven gear is determined by the rotational angle of the drive gear and a gear ratio of the drive gear to the driven gear.

In an embodiment, the rotational angle of the driven gear is the same as that of the reflective mirror member, which is coaxially rotated with the shaft.

In another embodiment, the gear set comprises a gear stand, a first drive gear, a second drive gear and a driven gear. The gear stand is disposed on the base. The first drive gear is sheathed around a drive gear shaft and rotatably mounted on the gear stand, so that the first drive gear is rotated with the drive gear shaft. The second drive gear is coaxially sheathed around the drive gear shaft with the first drive gear and rotatably mounted on the gear stand, so that the second drive gear is rotated with the drive gear shaft. The radius of the first drive gear is greater than that of the second drive gear, and the first drive gear is directly rotated by a user to perform angular adjustment. The driven gear is rotatably mounted on one side of the reflective mirror stand and sheathed around the shaft to be rotated with the shaft, wherein the driven gear is engaged with the second drive gear.

In an embodiment, the number of teeth on the driven gear is more than the number of teeth on the second drive gear, so that the driven gear is driven to rotate at a relatively smaller angle when the first drive gear is rotated at a relatively larger angle.

In an embodiment, the driven gear is driven to rotate when the first drive gear is rotated to drive coaxial rotation of the second drive gear, and the rotational angle of the driven gear is determined by the rotational angle of the first drive gear and a gear ratio of the second drive gear to the driven gear.

In an embodiment, the rotational angle of the driven gear is the same as that of the reflective mirror member, which is coaxially rotated with the shaft.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
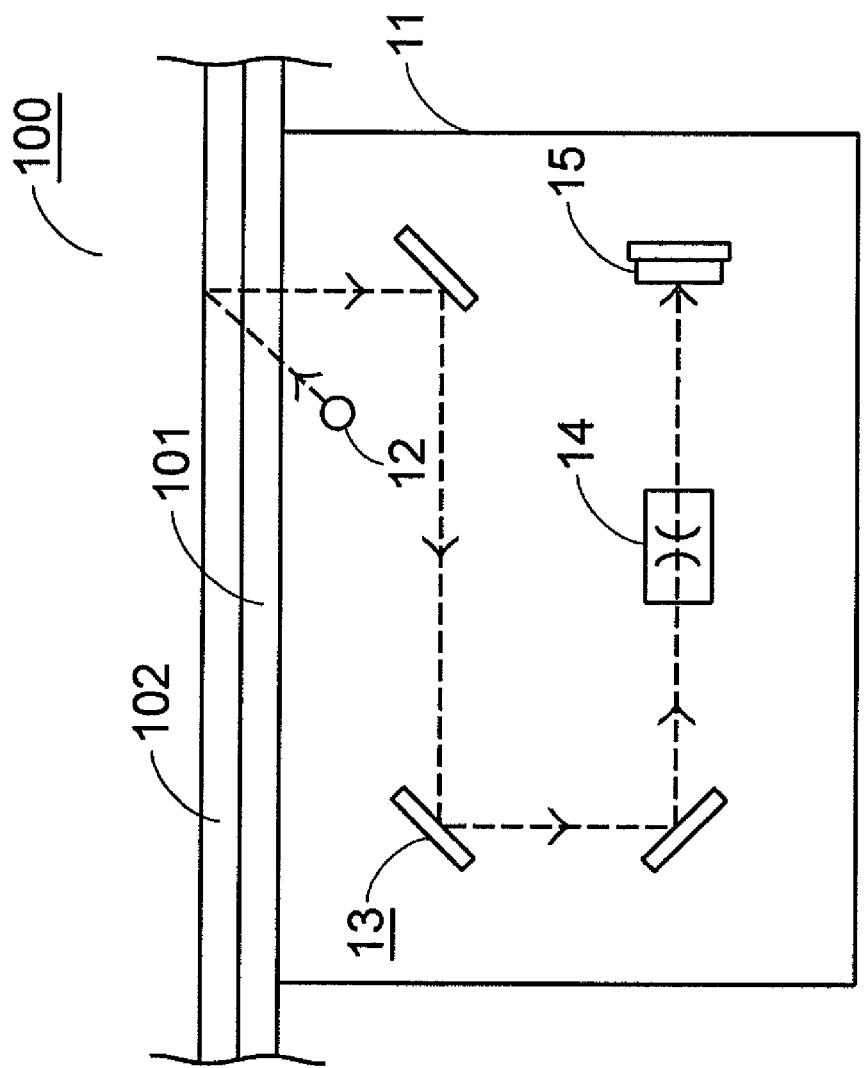
FIG. 1 is a schematic cross-sectional view of a conventional scanning module 100.
Figure 2A:
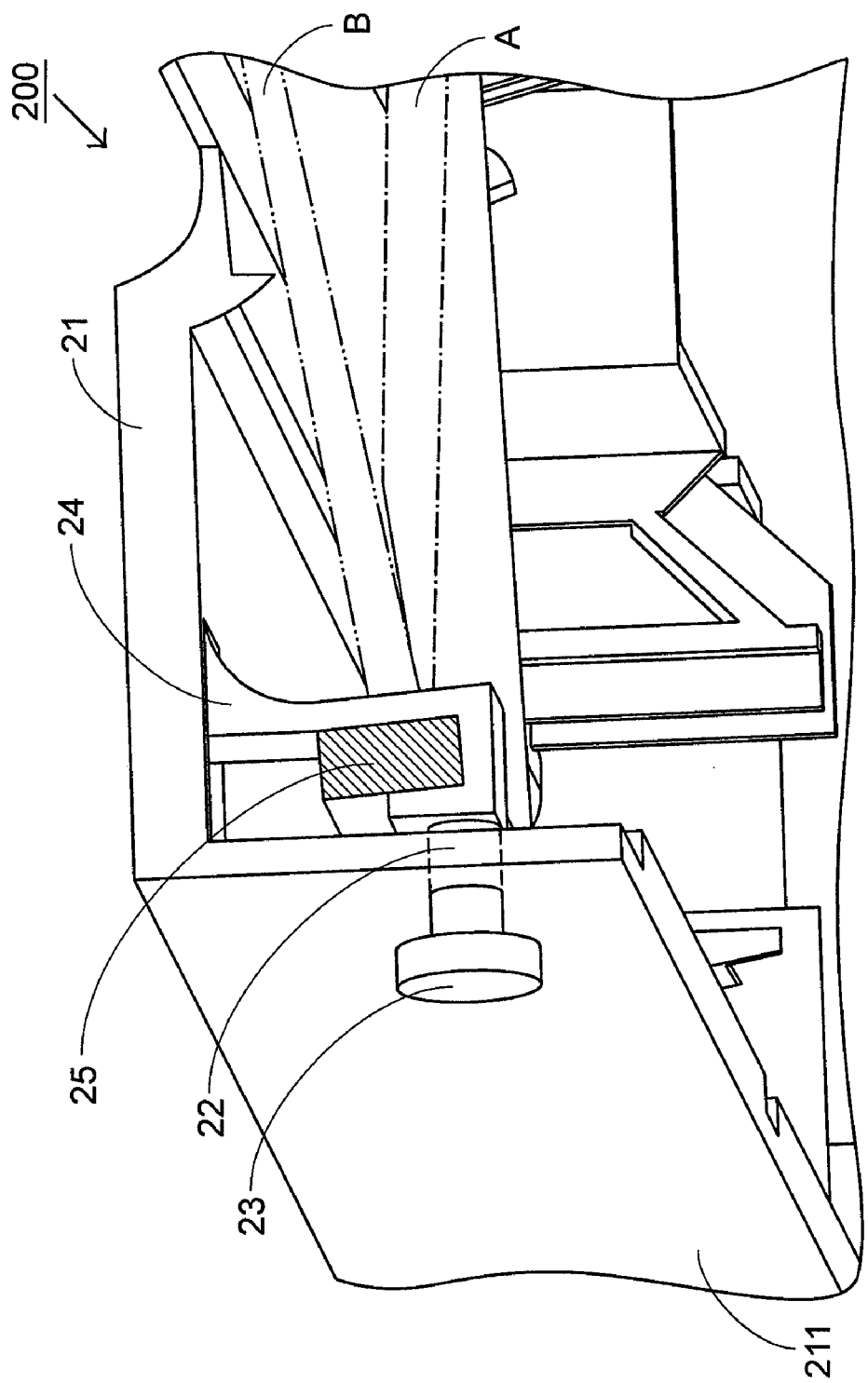
FIG. 2(a) is a schematic perspective view of another conventional scanning module 200.
Figure 2B:
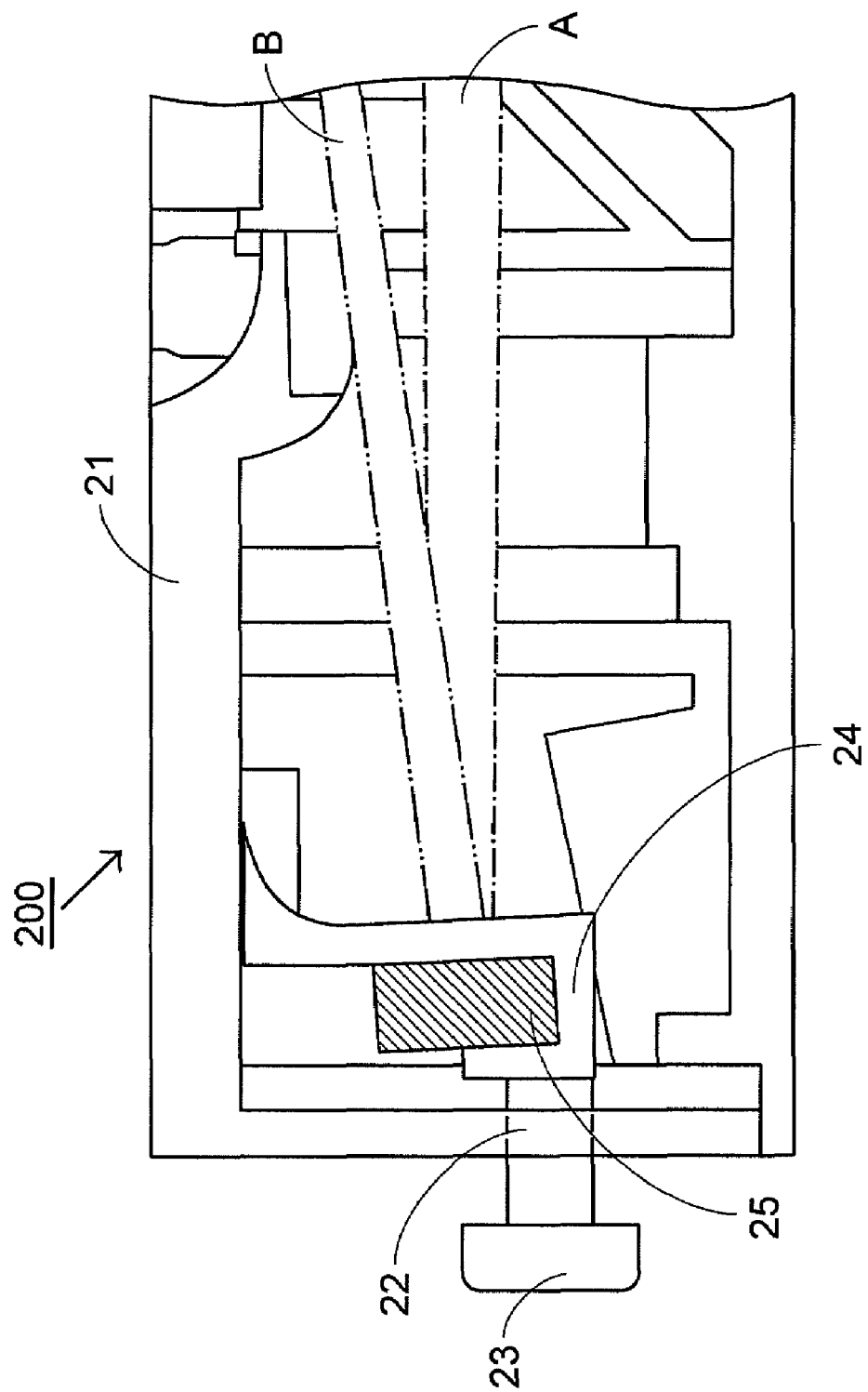
FIG. 2(b) is a schematic side view of the scanning module 200 of FIG. 2(a)
Figure 3A:
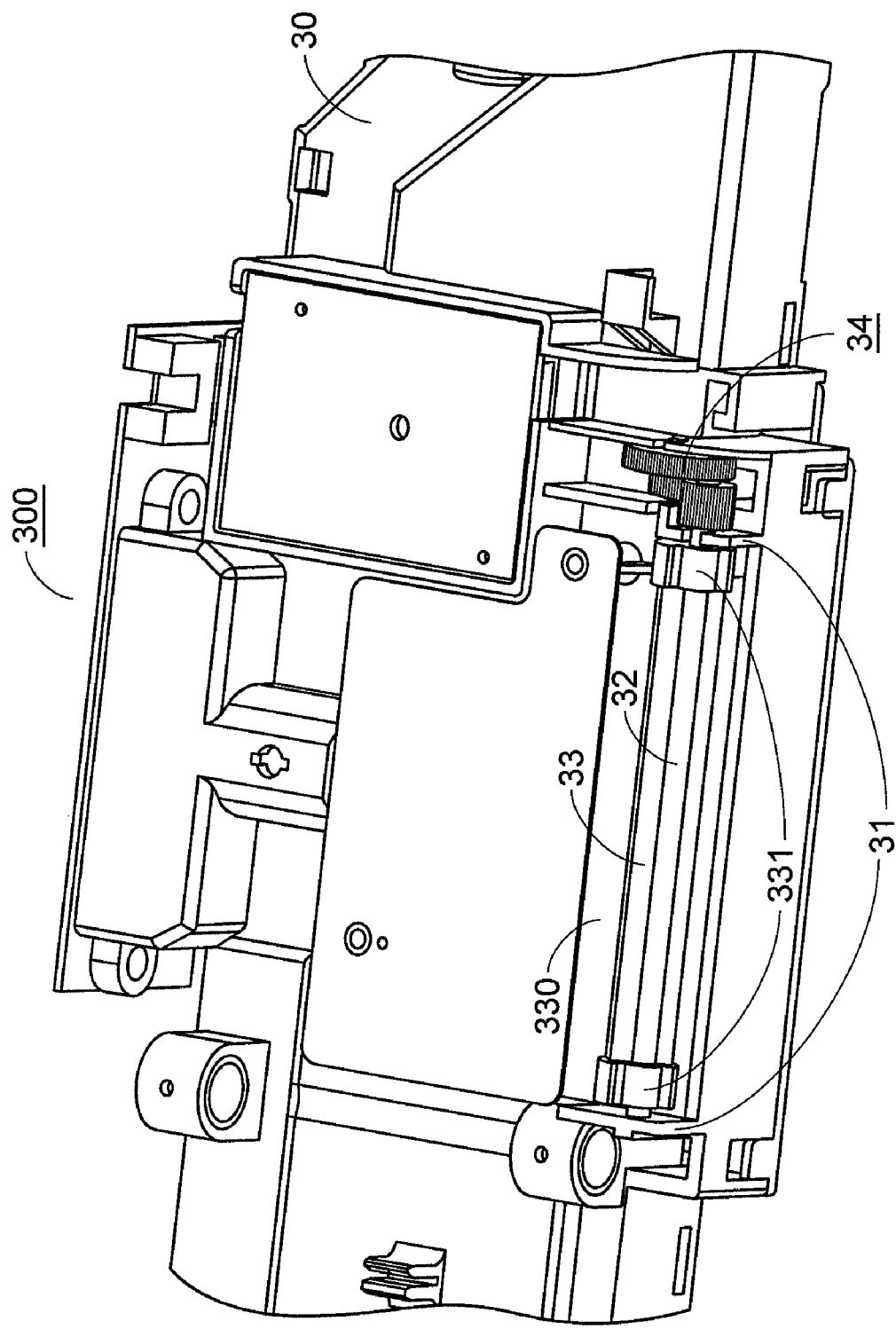
FIG. 3(a) is a partial schematic perspective view of a scanning module 300 according to a preferred embodiment of the present invention.

Referring to FIG. 3(a), a partial schematic perspective view of a scanning module 300 according to a preferred embodiment of the present invention is illustrated. The scanning module 300 comprises a base 30, a reflective mirror stand 31, a shaft 32, a reflective mirror member 330 and a gear set 34. The scanning module 300 includes plural reflective mirrors for successively reflecting light of the document's image. For clarity and neat drawing, however, only one reflective mirror member 330 is shown in the drawing. The structure and the adjustment involving this reflective mirror member 330 are applicable to the other reflective mirrors contained in the scanning module 300. In this embodiment, only the main features of the present invention are illustrated but the description involving the light source, the optical lens and the optical sensor will be omitted for a purpose of clarity.

Please refer to FIG. 3(a) again. The reflective mirror stand 31 is mounted on the base 30. Two pivotal apertures are formed on the reflective mirror stand 31 for supporting both ends of the shaft 32, so that the shaft 32 is rotatably mounted on the reflective mirror stand 31. The reflective mirror member 330 includes a reflective mirror 33 and a set of fixing elements. The reflective mirror 33 is mounted on the shaft 32 and both ends of the reflective mirror 33 are fixed by the fixing elements, so that the reflective mirror 33 is rotated with the shaft 32. Furthermore, the gear set 34 is pivotally coupled to the shaft 32 and disposed at one side of the reflective mirror stand 31. Upon rotation of the gear set 34, the shaft 32 is driven to rotate. Under this circumstance, the reflective angle of the reflective mirror 33, which is coupled to the shaft 32, is changed and adjustable.

Figure 3B:
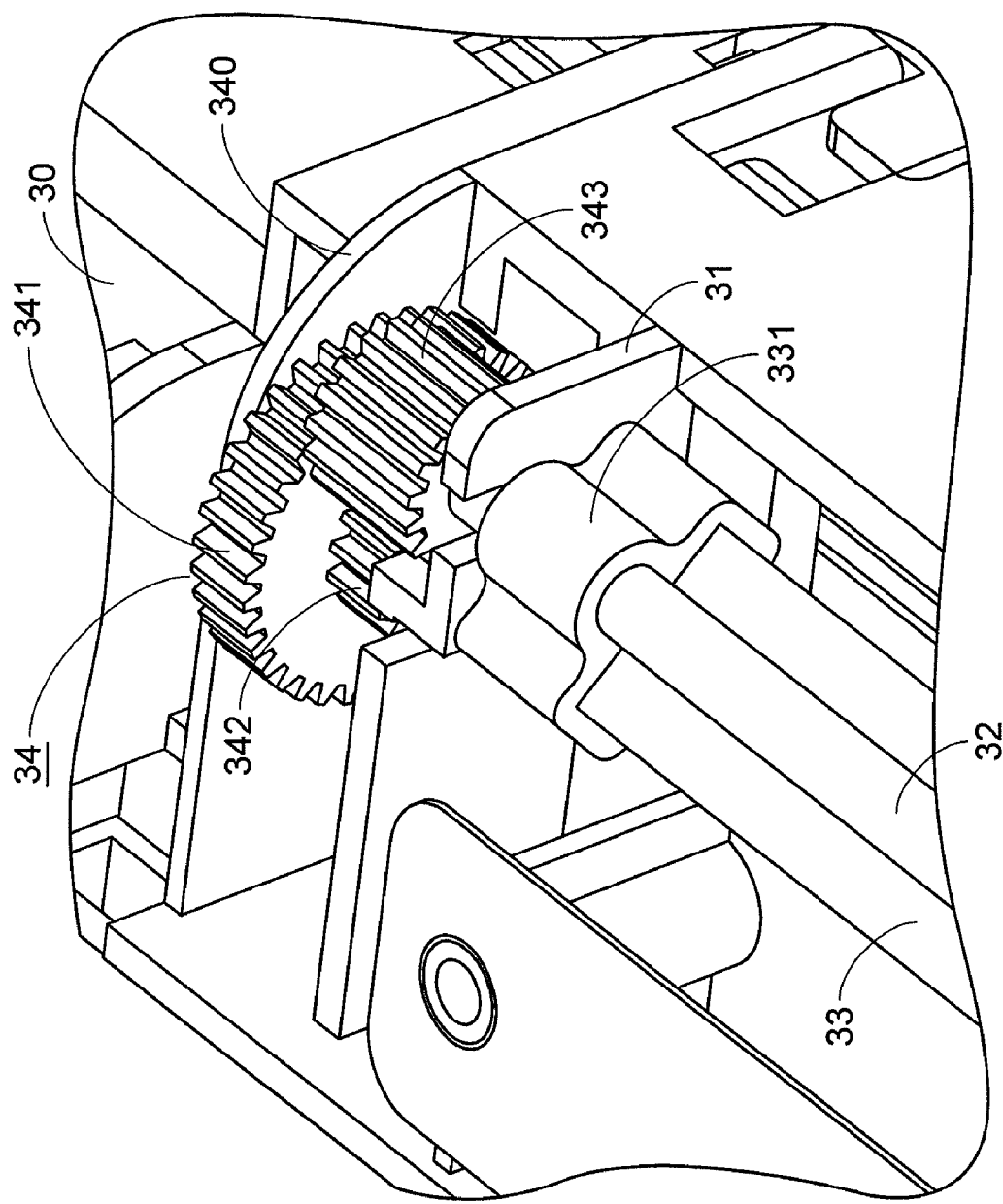
FIG. 3(b) is a schematic perspective view of a gear set 34 used in the scanning module 300 of FIG. 3(a)

Referring to FIG. 3(b), a schematic perspective view of the gear set 34 is illustrated. The gear set 34 includes a gear stand 340, a first drive gear 341, a second drive gear 342 and a driven gear 343. The gear stand 340 is disposed at one side of the reflective mirror stand 31 and mounted on the base 30. Two pivotal apertures are also formed on the gear stand 340 for supporting both ends of a drive gear shaft (not shown in this drawing), so that the drive gear shaft is rotatably mounted on the gear stand 340. In this embodiment, the first drive gear 341 and the second drive gear 342 are coaxially sheathed around the drive gear shaft and mounted on the gear stand 340. As a consequence, the first drive gear 341 and the second drive gear 342 are synchronously rotated with the drive gear shaft. When the first drive gear 341 is rotated at a certain angle in a specified direction, the second drive gear 342 is also rotated at the certain angle in the specified direction.

In this embodiment, the radius of the first drive gear 341 is greater than that of the second drive gear 342, as is shown in FIG. 3(b). In addition, the periphery of the first drive gear 341 is extended above the gear stand 340, so that the user may easily rotate the first drive gear 341 of the gear set 34 to perform angular adjustment. The driven gear 343 is rotatably mounted on one side of the reflective mirror stand 31 and sheathed around the shaft 32 to be rotated with the shaft 32. The driven gear 343 is engaged with the second drive gear 342. Upon rotation of the first drive gear 341, the second drive gear 342 is synchronously rotated and the driven gear 343 is driven to rotate.

In the above embodiment, the radius of the driven gear 343 is greater than that of the second drive gear 342. In addition, the number of teeth on the driven gear 343 is more than the number of teeth on the second drive gear 342. When the first drive gear 341 is rotated at a relatively larger angle, the driven gear 343 is driven to rotate at a relatively smaller angle. For example, in a case that the radius of the second drive gear 342 is half the radius of the driven gear 343, the teeth on the second drive gear 342 will be half the number of teeth on the driven gear 343. If the first drive gear 341 is rotated for a turn, the second drive gear 342 will be rotated for a turn due to coaxial rotation. Whereas, according to a gear ratio of the teeth on the second drive gear 342 to the number of teeth on the driven gear 343, the driven gear 343 is rotated for a half turn at the moment. Accordingly, a coarse tuning of the first drive gear 341 results in a fine tuning of the driven gear 343. In other words, the rotational angle of the driven gear 343 is determined by the rotational angle of the first drive gear 341 and the gear ratio of the second drive gear 342 to the driven gear 343. Moreover, since the driven gear 343 is coupled to the shaft 32, the rotational angle of the driven gear 343 is the same as that of the reflective mirror 33 and thus the reflective angle of the reflective mirror 33 is adjusted at such a rotational angle.

Figure 3C:
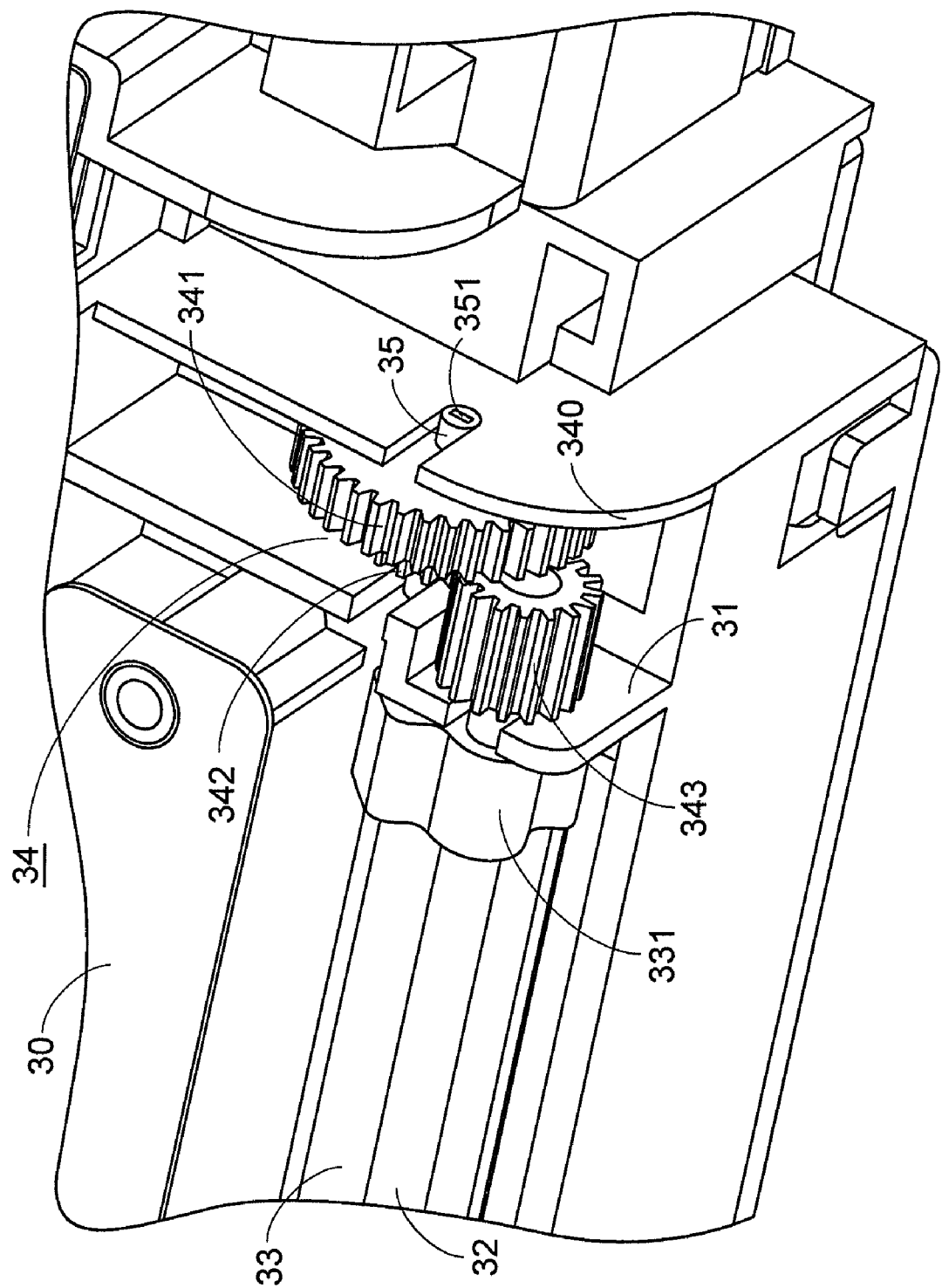
FIG. 3(c) is a schematic perspective view of the gear set 34 used in the scanning module 300 of FIG. 3(a) taken from another viewpoint.

Referring to FIG. 3(c), a schematic perspective view of the gear set 34 taken from another viewpoint is illustrated. By directly rotating the first drive gear 341 of the gear set 34, the reflective angle of reflective mirror 33 is adjustable. Alternatively, the drive gear shaft 35 is designed to have a screw hole 351, which is disposed in an end of the drive gear shaft 35 and exposed to the outside of the gear set 34. By inserting a rotating tool such as a screwdriver into the screw hole 351, the first drive gear 341 is driven to rotate. Since the gear set 34 is a precise component of the scanning module 300 and the screw hole 351 is exposed to the outside of the gear set 34, it is convenient and easy for the user to adjust the reflective angle of reflective mirror 33.

Moreover, the first drive gear 341 and the second drive gear 342 can be replaced with a single drive gear. The driven gear 343 is engaged with the drive gear. Upon rotation of the drive gear, the driven gear 343 is driven to rotate and thus the reflective angle of the reflective mirror 33 is adjusted at the rotational angle of the driven gear 343. Likewise, the radius of this drive gear is smaller than that of the driven gear 343, and the number of teeth on the drive gear is less than the number of teeth on the driven gear 343. In such way, when the drive gear is rotated at a relatively larger angle, the driven gear 343 is driven to rotate at a relatively smaller angle. It is noted that, however, those skilled in the art will readily observe that numerous modifications and alterations of the gear set may be made while retaining the teachings of the invention. For example, the drive gear of the gear set 34 can be replaced with several gears so long as the driven gear 343 is driven to rotate by these gears. Accordingly, the above disclosure should be limited only by the bounds of the following claims. The possible combinations of these gears are apparent to those skilled in the art, and are not redundantly described herein.

From the above description, the present invention is capable of easily adjusting the reflective mirror 33. In addition, according to a gear ratio of the teeth on the second drive gear 342 to the number of teeth on the driven gear 343, fine tuning of the reflective mirror 33 is permissible. Therefore, the problem occurred in the prior is overcome. Moreover, since all the gears of the gear set 34 are roatable back and forth, the reflective mirror 33 is adjustable along two direction, so that the problem of allowing rotation along a single direction in the prior art is overcome. As a result, more precise angular adjustment of the reflective mirror is achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning module of an image scanner for scanning a document, said scanning module of said image scanner comprising:
   a base;
   a reflective mirror stand mounted on said base;
   a mirror shaft rotatably mounted on said reflective mirror stand;
   a reflective mirror member fixed on said shaft and rotated with said shaft;
   a gear set pivotally coupled to said shaft for rotating and driving said shaft to adjust the reflective angle of said reflective mirror member, which is fixed on said shaft where said gear set comprises;
   a gear stand disposed on said base;
   a drive gear shaft wherein said drive gear shaft has a screw hole exposed to the outside of said gear set, so that said drive gear is rotated by a rotating tool after said rotating tool is inserted into said screw hole;
   a drive gear sheathed around said drive gear shaft and rotatably mounted on said gear stand, so that said drive gear is rotated with said drive gear shaft; and
   a driven gear rotatably mounted on one side of said reflective mirror stand and sheathed around said mirror shaft to be rotated with said shaft, wherein said driven gear is engaged with said drive gear.

2. A scanning module of an image scanner for scanning a document, said scanning module of said image scanner comprising:
   a base;
   a reflective mirror stand mounted on said base;
   a mirror shaft rotatably mounted on said reflective mirror stand;
   a reflective mirror member fixed on said shaft and rotated with said shaft;
   a gear set pivotally coupled to said shaft for rotating and driving said shaft to adjust the reflective angle of said reflective mirror member, which is fixed on said shaft where said gear set comprises;
   a gear stand disposed on said base;
   a drive gear sheathed around a drive gear shaft and rotatably mounted on said gear stand, so that said drive gear is rotated with said drive gear shaft; and
   a driven gear rotatably mounted on one side of said reflective mirror stand and sheathed around said mirror shaft to be rotated with said shaft, wherein said driven gear is engaged with said drive gear and wherein the rotational angle of said driven gear is the same as that of said reflective mirror member, which is coaxially rotated with said mirror shaft.

3. A scanning module of an image scanner for scanning a document, said scanning module of said image scanner comprising:
- a base;
- a reflective mirror stand mounted on said base;
- a mirror shaft rotatably mounted on said reflective mirror stand;
- a reflective mirror member fixed on said shaft and rotated with said shaft; and
- a gear set pivotally coupled to said shaft for rotating and driving said shaft to adjust the reflective angle of said reflective mirror member, which is fixed on said shaft where said gear set comprises:
- a gear stand disposed on said base;
- a first drive gear sheathed around a drive gear shaft and rotatably mounted on said gear stand, so that said first drive gear is rotated with said drive gear shaft;
- a second drive gear coaxially sheathed around said drive gear shaft with said first drive gear and rotatably mounted on said gear stand, so that said second drive gear is rotated with said drive gear shaft, wherein the radius of said first drive gear is greater than that of said second drive gear, and said first drive gear is directly rotated by a user to perform angular adjustment; and
- a driven gear rotatably mounted on one side of said reflective mirror stand and sheathed around said mirror shaft to be rotated with said mirror shaft, wherein said driven gear is engaged with said second drive gear.

4. The scanning module of said image scanner according to claim 3 wherein the number of teeth on said driven gear is more than the number of teeth on said second drive gear, so that said driven gear is driven to rotate at a relatively smaller angle when said first drive gear is rotated at a relatively larger angle.

5. The scanning module of said image scanner according to claim 3 wherein said driven gear is driven to rotate when said first drive gear is rotated to drive coaxial rotation of said second drive gear, and the rotational angle of said driven gear is determined by the rotational angle of said first drive gear and a gear ratio of said second drive gear to said driven gear.

6. The scanning module of said image scanner according to claim 3 wherein the rotational angle of said driven gear is the same as that of said reflective mirror member, which is coaxially rotated with said mirror shaft.

* * * * *